(12) United States Patent
Burnley

(10) Patent No.: US 7,413,370 B2
(45) Date of Patent: Aug. 19, 2008

(54) QUICK CONNECT COUPLING

(75) Inventor: Michael Burnley, Hollywood, FL (US)

(73) Assignee: Taco Metals, Inc.

(*) Notice: Subject to any disclaimer, the term of this patent is extended or adjusted under 35 U.S.C. 154(b) by 349 days.

(21) Appl. No.: 11/256,602

(22) Filed: Oct. 21, 2005

(65) Prior Publication Data
US 2008/0007054 A1  Jan. 10, 2008

Related U.S. Application Data

(60) Provisional application No. 60/620,785, filed on Oct. 21, 2004.

(51) Int. Cl.
*B25G 3/12* (2006.01)

(52) U.S. Cl. .................................... 403/325

(58) Field of Classification Search ............... 403/321, 403/322.1, 324–328; 135/88.05, 88.07, 88.153, 135/119, 161; 24/600.2; 248/288.31, 288.51
See application file for complete search history.

(56) References Cited

U.S. PATENT DOCUMENTS

| | | | | |
|---|---|---|---|---|
| 2,444,666 A * | 7/1948 | Orain | ........................ | 403/47 |
| 2,590,201 A * | 3/1952 | Nielsen | ........................ | 280/513 |
| 2,859,060 A * | 11/1958 | Davies et al. | ................ | 403/122 |
| 3,237,977 A * | 3/1966 | Batchelder | .................. | 403/331 |
| 3,269,760 A * | 8/1966 | Seckerson | .................... | 403/122 |
| 4,381,117 A * | 4/1983 | French et al. | ................ | 280/204 |
| 4,520,546 A * | 6/1985 | Darnell | ........................ | 29/441.1 |
| 5,133,572 A * | 7/1992 | Polito | .......................... | 280/513 |
| 6,338,332 B1 * | 1/2002 | Kluhsman | .................... | 123/400 |
| 6,792,836 B1 * | 9/2004 | Wang | ........................ | 81/177.85 |

* cited by examiner

*Primary Examiner*—Daniel P. Stodola
*Assistant Examiner*—Joshua T Kennedy
(74) *Attorney, Agent, or Firm*—Robert M. Schwartz; Alfred K. Dassler

(57) ABSTRACT

A quick connect coupling assembly for mounting an accessory tube to a mounting base having a stem connecting a ball to the base. The assembly includes a cylindrically shaped main body having a cavity formed therein for receiving the ball. A coupling sleeve has an orifice and a profiled cutout formed in the circumference of the sleeve. A spring is disposed on the main body and abutting the sleeve. A guiding mechanism is fixed to the main body and interacts with the orifice for compressing the spring and mounting the sleeve on the main body. The guiding mechanism aligns the cutout with the cavity when the sleeve and the main body are positioned in a receiving position for receiving the ball.

16 Claims, 4 Drawing Sheets

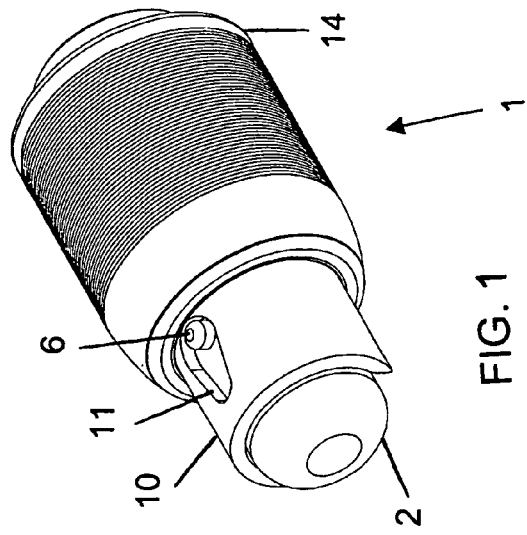
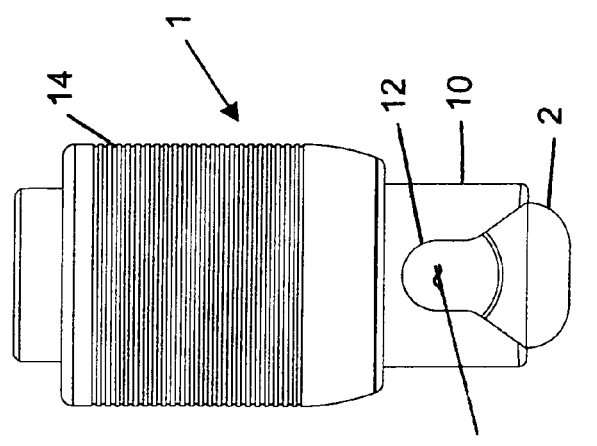
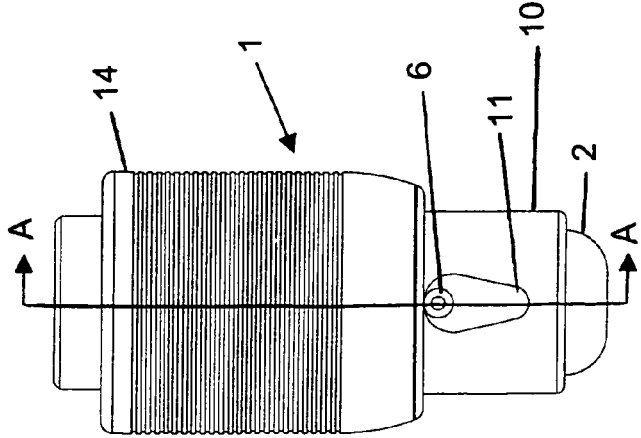
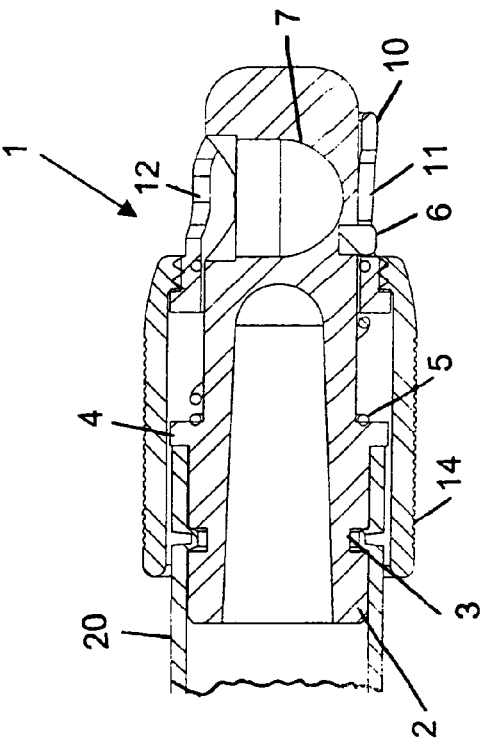
FIG. 1
FIG. 3
FIG. 4
FIG. 5

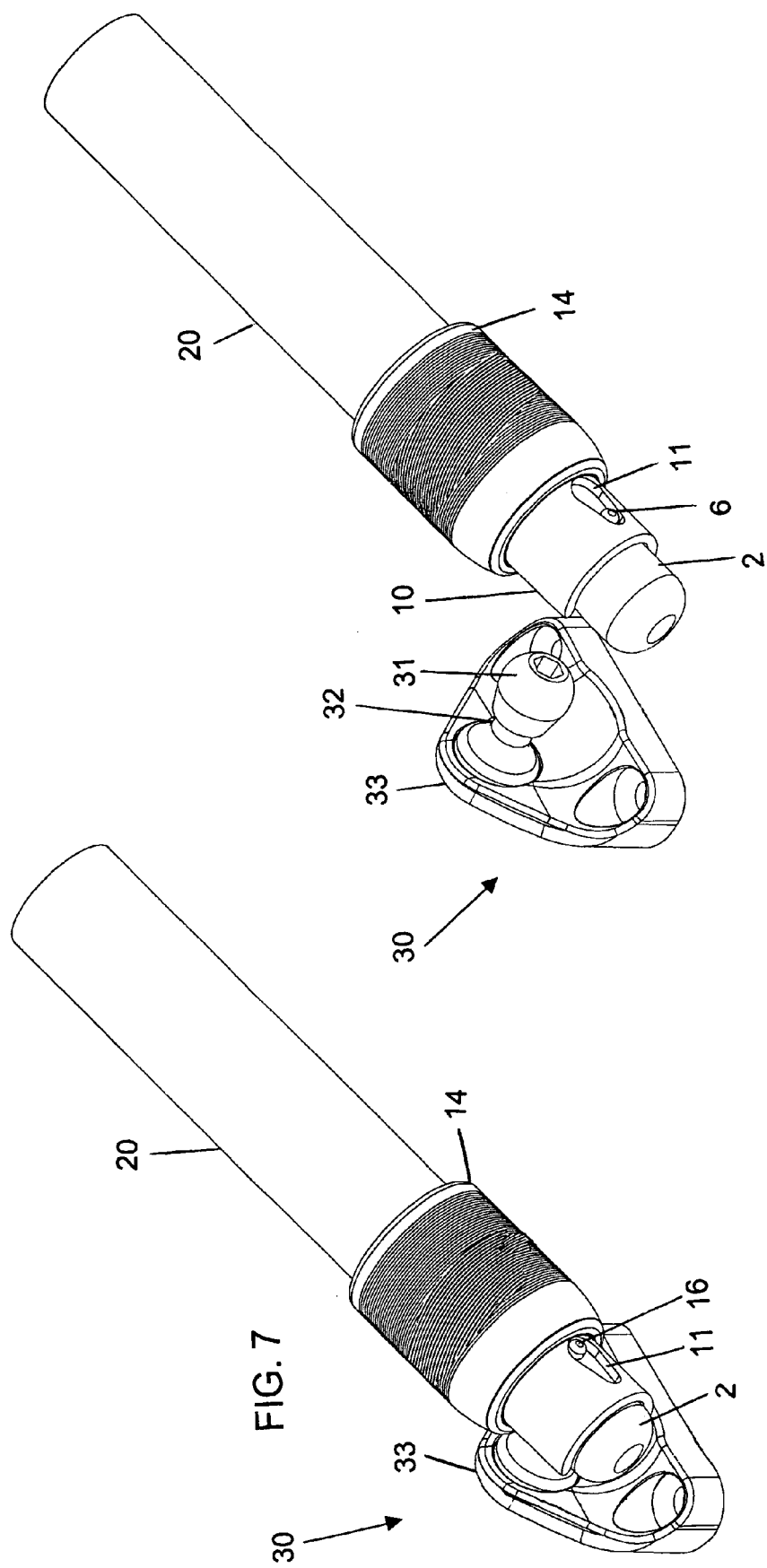

QUICK CONNECT COUPLING

CROSS-REFERENCE TO RELATED APPLICATIONS

This application claims the benefit of U.S. Provisional Application Ser. No. 60/620,785, filed on Oct. 21, 2004, entitled QUICK CONNECT COUPLING; the prior application is herewith incorporated by reference in its entirety.

BACKGROUND OF THE INVENTION

1. Field of the Invention

The present invention pertains to a quick connect coupling that is used to mount a folding canopy or roof or other accessory on a boat/marine vessel, by support posts/tubes. More specifically, to a quick connect coupling for attaching to a mating ball.

2. Description of the Related Art

The present invention is a connector for connecting accessory items such as a folding canopy or roof on a boat/marine vessel, by support posts/tubes. Connectors/retainers are used generally in boats, for removably mounting items to the hull and/or deck of a boat. The connectors are usually mounted on gunwales of a boat. The support post has a ball shaped end that slides into the retainer. The retainers are typically a socket retainer that receive the ball of the support post of the canopy and locks it in place so that the ball cannot be removed from the socket without unlocking it. Once locked in the socket retainer, the ball is free to move and rotate in the retainer as much as the stem of the ball will allow. The retainers may have a c-shaped channel and include two mounting holes for attachment to a surface, such as the gunwale of a boat. Socket retainers are made of stainless steel and include a plastic insert in the area that receives and retains the ball. A removable pin is inserted through the socket retainer to lock the ball end in place. The removable pin may be attached to a lanyard to prevent it from being lost or misplaced. The pin may also include a spring-loaded ball that keeps the pin from being unintentionally removed by vibration or other non-intentional ways.

The disadvantages of a socket retainer as described above are that the pin must be fully removed from the retainer to remove or insert the ball end of the canopy support pole. This can lead to difficulties in setting up the canopy. It also affords the possibility of pin being lost if the lanyard fails or if no lanyard is provided. If the pin is not disposed in the socket retainer, the pin can cause noise and may damage the surface of the boat. Also the socket retainer requires an additional step to the secure the ball after the ball is in place. Inserting the pin on a boat that is pitching can be very difficult.

SUMMARY OF THE INVENTION

It is accordingly an object of the invention to provide a quick connect coupling which overcomes the above-mentioned disadvantages of the heretofore-known devices of this general type and which provides a quick connect coupling that is easy to install and easy to use.

With the foregoing and other objects in view there is provided, a quick connect coupling assembly for mounting an accessory tube to a mounting base having a stem connecting a ball to the base. The assembly includes a cylindrically shaped main body having a cavity formed therein for receiving the ball. A coupling sleeve has an orifice and a profiled cutout formed in the circumference of the sleeve. A spring is disposed on the main body and abuts the sleeve. A guiding mechanism is fixed to the main body and interacts with the orifice for compressing the spring and mounting the sleeve on the main body. The guiding mechanism aligns the cutout with the cavity when the sleeve and the main body are positioned in a receiving position for receiving the ball.

In accordance with another feature of the invention, the orifice has a teardrop shape with a wide end and a narrow end and the cutout has a flared portion and a narrow portion. The guide mechanism interacts with the narrow end of the orifice for aligning the flared portion of the cutout with the cavity in the receiving position. The wide end of the orifice allows the sleeve to rotate with respect to the main body when the ball is attached to the coupling assembly in an attached position.

In accordance with a further feature of the invention, the guide mechanism is a pin.

In accordance with an added feature of the invention, the main body has a shoulder, which abuts the spring on one side thereof and the accessory tube on the other side thereof.

In accordance with an additional feature of the invention, the main body has a groove formed around its circumference for crimping the accessory tube to the main body.

In accordance with another mode of the invention, there is a gripping collar disposed on the sleeve for moving the sleeve into the receiving position.

In accordance with a further mode of the invention, the narrow portion of the cutout is dimensioned to allow the stem to pass through and to hold the ball in the cavity when the ball is in the attached position.

In accordance with an additional mode of the invention, the orifice has a triangular shape.

With the objects of the invention in view, there is also provided A quick connect coupling assembly for mounting an accessory tube to a mounting base having a stem connecting a ball to the base. The assembly includes a cylindrical main body having a cavity formed therein for receiving the ball. A coupling sleeve is movably attached to the main body. The sleeve has a cutout that is configured for allowing the ball to enter the cavity in a receiving position of the sleeve with respect to the main body. The cutout is configured to hold the ball in place in an attached position of the sleeve with respect to the main body. The assembly includes an alignment mechanism for aligning the cutout with respect to the cavity in the receiving position and for allowing the sleeve to rotate with respect to the main body in the attached position. A fixing mechanism is disposed between the main body and the sleeve for maintaining the attached position.

In accordance with yet an additional mode of the invention, the alignment mechanism includes a pin mounted to the main body, which interacts with an orifice formed in the sleeve.

In accordance with still an additional mode of the invention, the cutout has a flared portion for allowing the ball to enter the cavity. A narrow portion for allows the stem to pass therethrough and for holds the ball in the cavity in the attached position.

In accordance with yet an added feature of the invention, the fixing mechanism is a spring disposed between the sleeve and the main body.

Other features which are considered as characteristic for the invention are set forth in the appended claims.

Although the invention is illustrated and described herein as embodied as a quick connect coupling for mounting an accessory, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a perspective assembly view of the quick connect coupling according to the invention;

FIG. 3 is a side view of the of the of the quick connect coupling according to FIG. 1 in an attached position;

FIG. 4 is a side view opposite FIG. 3 of the of the of the quick connect coupling according to FIG. 1 in an attached position;

FIG. 5 is a section view taken along line A-A shown in FIG. 3 of the of the of the quick connect coupling according to FIG. 1;

FIG. 6 is a perspective view of the of the quick connect coupling according to FIG. 1 in an unmounted state with the mating part; and FIG. 7 is a perspective view of the quick connect coupling according to FIG. 1 in a mounted state with the mating part;

DESCRIPTION OF THE PREFERRED EMBODIMENTS

Figure 2:
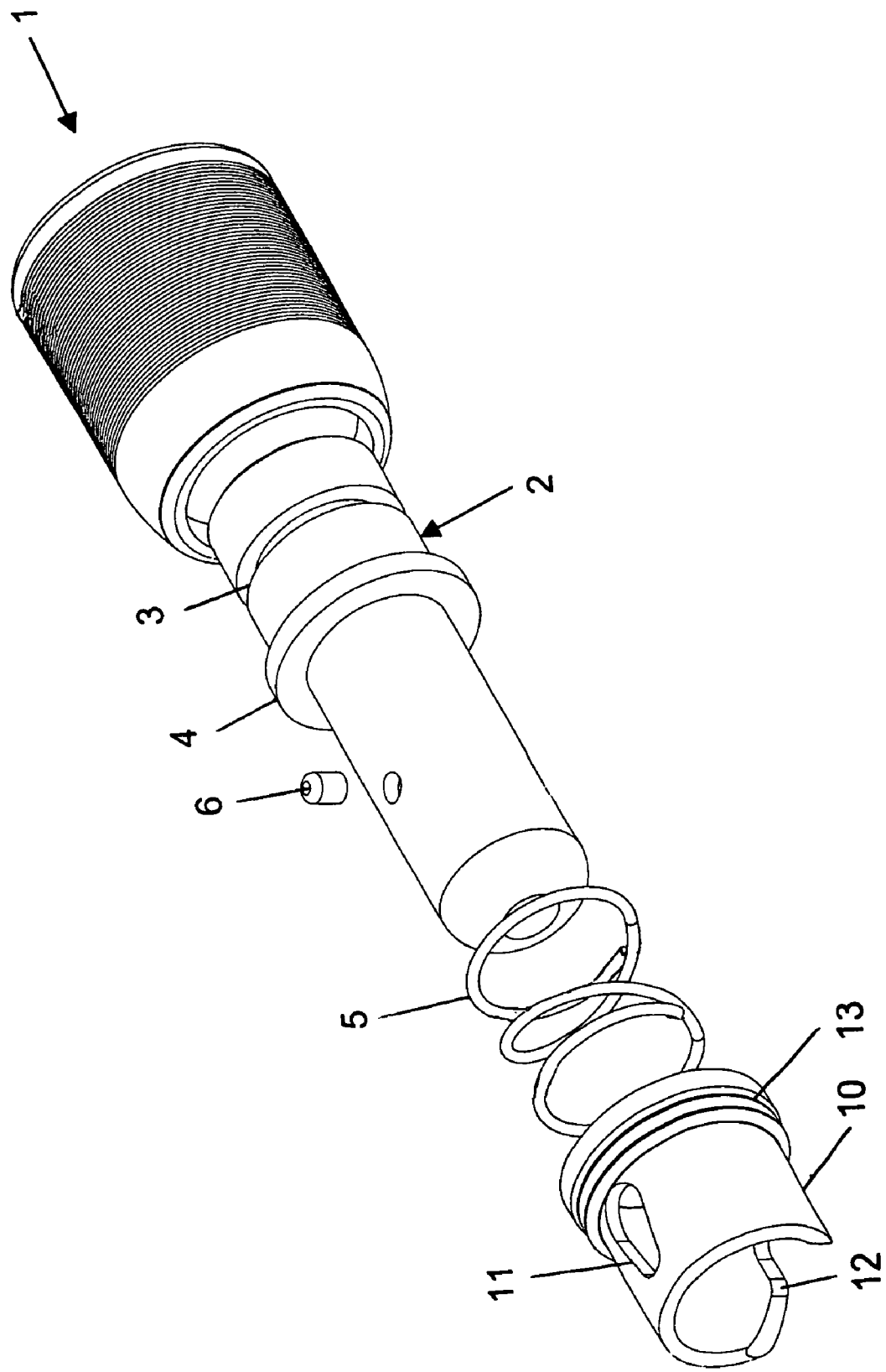
FIG. 2 is an exploded perspective view of the of the quick connect coupling according to FIG. 1.

Referring now to the figures of the drawing in detail and first, particularly, to FIGS. 1 and 2 thereof, a quick connect coupling 1 is shown. The coupling 1 has a substantially cylindrical main body portion 2. The main body portion 2 includes a groove 3 formed around its circumference for fixing the connector to an accessory support tube 20 (FIGS. 6 and 7). This is accomplished by crimping the support tube 20 into the groove 3. The main body 2 has a shoulder 4 which acts as stop for the support tube 20. The main body 2 has a cavity 7 formed therein, the cavity 7 can be cylindrical and has a bottom with a spherical radius that corresponds to the radius of the mating ball 31 of a mounting part 30 that is attached to the deck of boat. The mounting part 30 has a base 33 and a mating ball 31 that is connected to the base 33 by a stem 32 (FIG. 6).

A cylindrical coupling head or sleeve 10 is disposed on the main body 2 of the quick connect coupling 1. The coupling head 10 slides onto the main body 2 and compresses a spring 5 against the shoulder 4. A pin 6 is inserted through a teardrop shaped orifice 11 that is formed in the circumference of the coupling head 10. The pin 6 is attached to the main body 2. Although described and shown as a teardrop shape, the orifice may be of any geometry that tapers from wide to narrow (such as a triangular shape). The pin 6 holds the coupling head 10 on the main body 2. As can be seen in FIG. 4, opposite the teardrop shaped orifice 11 a profiled cutout 12 is formed in the circumference of the coupling head 10. Although the profiled cutout 12 is shown and described as being opposite the teardrop shaped profile 11, any orientation is acceptable as long as it does not interfere with the operation of the quick connect coupling 1.

Figure 8:
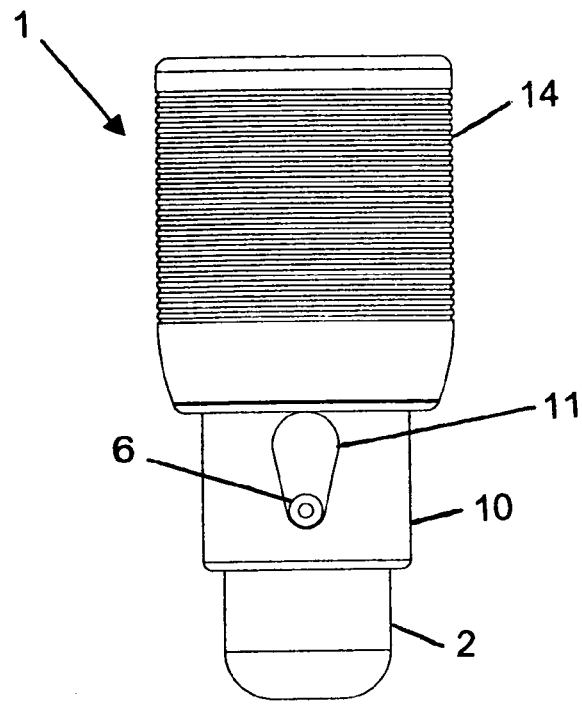
FIG. 8 is a side view of the of the of the quick connect coupling according to FIG. 1 in a receiving position.

The cutout 12 is shaped as follows. As is shown in FIG. 8, a flared portion of the cutout 12 is sized so as to be large enough to allow the ball 31 to enter the cavity 7 when the coupling head 10 compresses the spring 5 and the quick connect coupling 1 is ready to receive the ball 31. The narrower portion of the cutout 12 is sized so as to be small enough to hold the ball 31 in the cavity 7 and large enough to allow the stem 32 to pass through with sufficient clearance when the quick connect coupling 1 is in the attached position.

Figure 9:
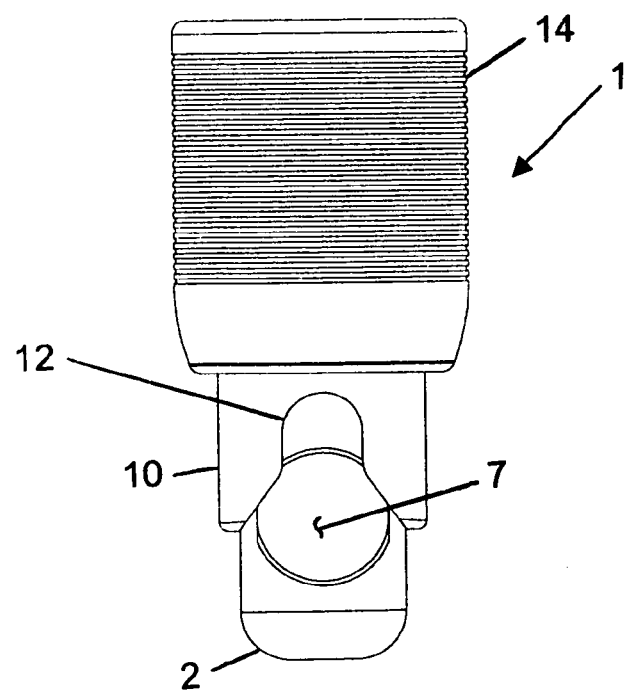
FIG. 9 is a side view opposite FIG. 8 of the of the of the quick connect coupling according to FIG. 1 in a receiving position.

As is shown in FIG. 3, the wider side of the teardrop cutout 11 together with the pin 6, functions to limit the travel of the coupling head 10 caused by the compressed spring 5, while at the same time it allows the coupling head 10 to rotate with respect to the main body 2. This rotation of the coupling head 10 is beneficial because it allows movement of the ball 31 and stem 32 in the quick connect coupling 1. This reduces the amount of strain on the cover or accessory that is mounted with the quick connect coupling 1. When the coupling head is pushed down to compress the spring 5 (FIG. 8), the geometry of the narrow side of the teardrop shaped cutout 11 automatically centers the cutout 12 with respect to the cavity 7 (FIG. 9) so as to facilitate easy removal/insertion of the ball 31 (FIG. 6). The coupling head 10 also includes a thread 13 for attaching a gripping collar 14 which may be made of plastic or any other suitable material. The gripping collar 14 is used to move the coupling head 10 to compress the spring 5 thereby allowing the ball 31 to enter the cavity 7.

The use of the above-described quick connect coupling 1 is as follows. The quick connect coupling 1 is positioned near the ball 31. The collar 14 is moved to compress the spring 5, this causes the pin 6 and the teardrop orifice 11 to center the cutout profile 12 with respect to the cavity for allowing the flared end of the cutout profile 12 to clear the cavity 7. The ball 31 is inserted into the cavity 7 and the collar 14 is released. The spring 5 pushes the coupling head 10 forward until the pin 6 reaches the wider side of the teardrop cutout 11. Once the collar 14 is released, the coupling head 10 moves into the attached position for securely mounting the accessory. No further steps are required by the user to complete the attachment of the quick connect coupling 1.

The present invention is a tremendous improvement over any of the devices know from the prior art because the orifice 11 allows the sleeve 10 to center itself when slid into the receiving position, while at the same time orifice allows the sleeve 10 to rotate with respect to the main body 2 in the attached position. Furthermore, a subsequent step (insertion of a pin, etc.) is not required to put the quick connect coupling 1 into an attached position.

I claim:

1. A quick connect coupling assembly for mounting an accessory tube to a mounting base having a stem connecting a ball to the base, the assembly comprising:

a cylindrically shaped main body having a cavity formed therein for receiving the ball;

a coupling sleeve having an orifice formed in a circumference of said sleeve and a profiled cutout formed in the circumference of said sleeve said orifice having a wide end and a narrow end, said wide end of said orifice allowing said sleeve to rotate with respect to said main body when the ball is attached to the coupling assembly in an attached position;

a spring disposed on said main body and abutting said sleeve;

a guiding mechanism fixed to said main body and interacting with said orifice for compressing said spring and mounting said sleeve on said main body, and said guiding mechanism aligning said cutout with said cavity when said sleeve and said main body are positioned in a receiving position for receiving the ball.

2. The assembly according to claim 1, wherein said orifice has a teardrop shape with said wide end and said narrow end and said cutout has a flared portion and a narrow portion, said guide mechanism interacting with said narrow end of said orifice for aligning said flared portion of said cutout with said cavity in the receiving position.

3. The assembly according to claim 2, wherein said guide mechanism is a pin.

4. The assembly according to claim 3, wherein said main body has a shoulder which abuts said spring on one side thereof and which is configured to abut the accessory tube on the other side thereof.

5. The assembly according to claim 4, wherein said main body has a groove formed around its circumference configured for crimping the accessory tube to said main body.

6. The assembly according to claim 5, further comprising a gripping collar disposed on said sleeve for moving the sleeve into the receiving position.

7. The assembly according to claim 2, wherein said narrow portion of said cutout is dimensioned to allow the stem to pass through and to hold the ball in said cavity when the ball is in the attached position.

8. The assembly according to claim 2, wherein said orifice has a triangular shape.

9. A quick connect coupling assembly for mounting an accessory tube to a mounting base having a stem connecting a ball to the base, the assembly comprising:
- a cylindrical main body having a cavity formed therein for receiving the ball;
- a coupling sleeve movably attached to said main body, said sleeve having a cutout being configured for allowing the ball to enter said cavity in a receiving position of said sleeve with respect to said main body, said cutout being configured to hold the ball in place in an attached position of said sleeve with respect to said main body, said sleeve having an orifice formed in a circumference of said sleeve said orifice having a wide end and a narrow end;
- an alignment mechanism for aligning said cutout with respect to said cavity in the receiving position and for allowing said sleeve to rotate with respect to said main body in the attached position said alignment mechanism including a pin mounted to said main body interacting with said orifice formed in said circumference of said sleeve; and
- a fixing mechanism disposed between said main body and said sleeve for maintaining the attached position.

10. The assembly according to claim 9, wherein said cutout has a flared portion for allowing the ball to enter said cavity and a narrow portion for allowing the stem to pass therethrough and for holding the ball in said cavity in the attached position.

11. The assembly according to claim 10, wherein said fixing mechanism is a spring disposed between said sleeve and said main body.

12. The assembly according to claim 10, wherein said orifice has a teardrop shape.

13. The assembly according to claim 10, further comprising a gripping collar disposed on said sleeve for moving the sleeve into the receiving position.

14. The assembly according to claim 13, wherein said main body has a groove formed around its circumference configured for affixing said main body to the accessory tube.

15. The assembly according to claim 11, wherein said main body has a shoulder which abuts said spring on one side thereof and which is configured to abut the accessory tube on the other side thereof.

16. The assembly according to claim 10, wherein said orifice has a triangular shape.

* * * * *